United States Patent
Concepción Heydorn et al.

(10) Patent No.: US 10,336,649 B2
(45) Date of Patent: Jul. 2, 2019

(54) CERAMIC COMPOSITION FOR COATING METALLIC SURFACES, METHOD AND RESULTING CERAMIC LAYER

(71) Applicant: TORRECID, S.A., Alcora (Castellón) (ES)

(72) Inventors: Carlos Concepción Heydorn, Alcora (ES); Vicente Ferrando Catalá, Alcora (ES); Juan Vicente Corts Ripoll, Alcora (ES); Óscar Ruiz Vega, Alcora (ES)

(73) Assignee: TORRECID, S.A., Alcora (Castellon) (ES)

( * ) Notice: Subject to any disclaimer, the term of this patent is extended or adjusted under 35 U.S.C. 154(b) by 0 days.

(21) Appl. No.: 15/578,294

(22) PCT Filed: May 27, 2016

(86) PCT No.: PCT/ES2016/070401
§ 371 (c)(1),
(2) Date: Nov. 30, 2017

(87) PCT Pub. No.: WO2016/203075
PCT Pub. Date: Dec. 22, 2016

(65) Prior Publication Data
US 2018/0141852 A1    May 24, 2018

(51) Int. Cl.
*C03C 8/14* (2006.01)
*C03C 8/20* (2006.01)
*C23C 24/08* (2006.01)

(52) U.S. Cl.
CPC .............. *C03C 8/20* (2013.01); *C03C 8/14* (2013.01); *C23C 24/08* (2013.01)

(58) Field of Classification Search
CPC .................................. C03C 8/14; C03C 8/20
See application file for complete search history.

(56) References Cited

U.S. PATENT DOCUMENTS

| | | | |
|---|---|---|---|
| 3,184,320 A | 5/1965 | Michael | |
| 3,203,815 A | 8/1965 | Michael | |
| 4,147,835 A * | 4/1979 | Nishino | A47J 36/02 126/19 R |
| 4,385,127 A * | 5/1983 | Chyung | C03C 10/0054 501/5 |
| 5,250,360 A | 10/1993 | Andrus et al. | |
| 5,296,415 A | 3/1994 | Podesta | |
| 6,423,415 B1 * | 7/2002 | Greene | C03C 8/14 427/376.1 |
| 7,410,672 B2 * | 8/2008 | Waters | C03C 8/06 427/376.2 |
| 9,296,643 B2 * | 3/2016 | Kim | C03C 4/20 |
| 2003/0082306 A1 * | 5/2003 | Waters | C03C 8/06 427/376.2 |
| 2007/0265154 A1 | 11/2007 | Baldwin et al. | |
| 2013/0299482 A1 * | 11/2013 | Kim | C03C 4/20 219/391 |
| 2014/0302331 A1 | 10/2014 | Benford, Jr. et al. | |

FOREIGN PATENT DOCUMENTS

| | | |
|---|---|---|
| EP | 0 080 345 A1 | 6/1983 |
| EP | 0 739 997 A1 | 10/1996 |
| WO | 02/18128 A1 | 3/2002 |

OTHER PUBLICATIONS

International Search Report of PCT/ES2016/070401 dated Aug. 23, 2016 [PCT/ISA/210].

\* cited by examiner

*Primary Examiner* — Karl E Group
(74) *Attorney, Agent, or Firm* — Sughrue Mion, PLLC

(57) ABSTRACT

A ceramic composition for coating metallic surfaces, a method and a resulting ceramic layer, which layer refers to a ceramic composition which, after deposition, is subjected to a thermal treatment to generate a ceramic layer. The resulting ceramic layer displays, among other characteristics, appropriate adhesion to the metallic surface and remains stable at temperatures between 750° C. and 950° C.

11 Claims, No Drawings

CERAMIC COMPOSITION FOR COATING METALLIC SURFACES, METHOD AND RESULTING CERAMIC LAYER

CROSS REFERENCE TO RELATED APPLICATIONS

This application is a National Stage of International Application No. PCT/ES2016/070401, filed May 27, 2016, claiming priority based on Spanish Patent Application No. P201530838, filed Jun. 16, 2015, the contents of all of which are incorporated herein by reference in their entirety.

The invention discloses new ceramic compositions for application on metallic surfaces. More specifically, on metallic surfaces subjected to operating temperatures between 750° C. and 950° C. It likewise discloses a method for coating a metallic surface and the ceramic layer resulting from said process.

The present invention falls within the industrial sector of surface treatments of metals.

STATE OF THE ART

Metallic surfaces are currently used in numerous products and applications. Given the characteristics of metallic substrates, in many cases the metallic surface must be reinforced with a coating in order to improve its properties, such as water resistance, resistance to chemical agents, corrosion resistance, and resistance to stains or food, among others. One of the methods consists of the deposition of frits or inorganic compositions that are applied using different techniques (aerography, silk-screening, enamelling, electrostatic deposition, immersion coating, etc.). The metallic surface is later subjected to a thermal treatment that gives the deposited layer the necessary adhesion to the surface.

U.S. Pat. No. 5,296,415 describes a composition based exclusively on the use of a frit that contains $CeO_2$ in its composition, in a percentage by weight between 2.5% and 9%, in order to provide a high refraction index, as well as adherence and acid resistance. However, the composition of the frit as described in U.S. Pat. No. 5,296,415 presents softening point temperatures of around 500° C., as indicated in example 1 of the aforementioned patent. This, together with the fact that the composition only contains frit, indicates that it cannot be used as a coating for metallic surfaces subjected to operating temperatures greater than or equal to 750° C., because it loses its properties, such as the absence of porosity, resistance to acids, bases, molten salts, among others. U.S. Pat. No. 5,296,415 also covers the incorporation of F compounds into the frit, in a percentage by weight between 0.3% and 5%, to improve adhesion to the metallic surface, which causes the generation of acid compounds that are harmful to the environment and that cause deterioration of gas scrubbing systems during firing.

Patent application US2014/0302331A1 describes a frit and additive composition which, after application to the metallic surface and thermal treatment, generates a surface for household ovens that prevents food from sticking during cooking. However, the composition of the frit and the presence of F compounds as additives, as described in patent application US2014/0302331A1, indicate that the composition begins to melt below 600° C., which means that it cannot be used on metallic surfaces that must remain unaltered at temperatures of 750° C. or higher. In addition, the invention according to application US2014/0302331A1 contains F compounds and $NO_2$, which causes the generation of acid compounds and nitrogen oxides that are harmful to the environment and that cause deterioration of gas scrubbing systems during firing. Lastly, it should be noted that application US2014/0302331A1 requires two applications or layers, called the "ground coat" and "cover coat" to achieve the desired properties, which increases the cost in comparison with a single application.

Another example in the prior art is patent application US2007/0265154, which describes an enamel with a metallic appearance that is subjected to a thermal treatment between 760° C. and 870° C. This composition contains one or more frits with melting points between 704° C. and 927° C., grinding additives, and optionally, a pigment. The composition of the frits according to application US2007/0265154, also comprises F compounds and $NO_2$. From patent US2007/0265154, it can be deduced that the enamel composition has a softening point of less than 750° C., which makes its use infeasible with metallic surfaces subjected to operating temperatures above that temperature. Once again, and as additional information, the presence of F compounds and $NO_2$ causes the generation of acid compounds and nitrogen oxides that are harmful to the environment and that cause deterioration of gas scrubbing systems during firing.

EXPLANATION OF THE INVENTION

The present invention provides a ceramic composition, without F compounds and $NO_2$, designed for the coating of metallic surfaces. The resulting coating, called the ceramic layer, presents, among other characteristics, proper adhesion to the metallic surface and remains unaltered at temperatures between 750° C. and 950° C., thus overcoming the limitations of the prior art. In this sense, the ceramic composition that is the object of the invention is especially intended for applications that require metallic surfaces that must withstand high operating temperatures, in addition to resisting acids, bases, molten salts, aggregates and/or fossil fuels, among others. As in the case of tanks for chemical products, molten salt and oil tanks for solar thermal power applications, pipelines for oil extraction and heat exchangers, among others.

According to the present invention, the ceramic composition contains at least one or several frits with softening points above 675° C. and whose percentage by weight is between 40% and 82%. Likewise, the frit or frit mixture comprises $SiO_2$ between 55% and 70% by weight, $R_2O$ between 7% and 20% by weight, RO between 0% and 15% by weight, MOx between 0% and 8% by weight, $MO_2$ between 0% and 7% by weight, $Al_2O_3$ 0.5% and 8% by weight, and $B_2O_3$ between 3% and 10% by weight. The formula $R_2O$ represents at least one oxide selected from among $Li_2O$, $Na_2O$, and $K_2O$ or a mixture of them. The formula RO represents at least one oxide selected from among ZnO, MgO, CaO and BaO or a mixture of them. The formula MOx represents at least one oxide selected from among CuO, $MnO_2$, $Fe_2O_3$, $MoO_3$, CoO and NiO or a mixture of them. The formula $MO_2$ represents at least one oxide selected between $TiO_2$ and $CeO_2$ or a mixture of them.

Another aspect of the ceramic composition that is the object of the invention is that it contains at least one or more refractory compounds, with melting points above 1,600° C. and whose percentage by weight is between 15% and 50%. The term "refractory compound" as it is used in this invention refers to all inorganic compounds present in nature or obtained industrially, that have the property of resistance to high temperatures, remaining unaltered and without breaking down. The refractory compound according to this invention is selected from among $ZrO_2$, $Cr_2O_3$, $Al_2O_3$, $SiO_2$, $ZrSiO_4$, Mullite, compounds that contain Zr and/or Cr and/or Cu, or a mixture of them. Preferably, the refractory compound according to the present invention includes $ZrO_2$ and/or $Cr_2O_3$, alone or mixed together, or with $Al_2O_3$, $SiO_2$, $ZrSiO_4$, Mullite or compounds that contain Zr and/or Cr and/or Cu. The presences of $ZrO_2$ and/or $Cr_2O_3$ in the ceramic composition guarantees the stability of the ceramic layer to high temperatures, thus improving on the existing coatings in the prior art.

A third characteristic of the present invention is that it comprises at least one or more synthetic compounds whose percentage by weight is between 3% and 10% and whose compositions contain Co or Ni or Cu or Fe or Mo or Mn or Cr, or a mixture of them. The term "synthetic compound" as it is used in the present invention refers to all inorganic compounds in powdered form obtained from a chemical reaction at a specific temperature and with the reactants in solid and/or liquid state.

The method for coating the metallic surface for the formation of the ceramic layer comprises two stages. The first stage consists of depositing the ceramic composition on the metallic surface. In this sense, the ceramic composition according to the present invention may be applied using any of the existing techniques, both dry and wet, for enamelling or coating metallic surfaces. Examples of these techniques, for the purposes of example but not limitation, are airbrushing, dip coating, silk-screening, ink injection, pad printing, electrophoresis and/or dry enamelling using electrostatic application, among others. The second stage consists of subjecting the metallic surface obtained in the first stage to a thermal treatment at a maximum temperature between 900° C. and 980° C. for a time, at that maximum temperature, between 2 and 10 minutes. The thermal treatment therefore converts the ceramic composition into a uniform ceramic layer, correctly adhered to the metallic substrate, a softening point between 850° C. and 960° C., a coefficient of thermal expansion at 300° C. between $80 \times 10^{-7}$ °C.$^{-1}$ y $100 \times 10^{-7}$ °C.$^{-1}$ and the property of remaining unalterable at temperatures between 750° C. and 950° C. The term "inalterable" in reference to the ceramic layer, as it is used in the present invention, means a layer or coating that adheres correctly to the metallic substrate and is physically and chemically stable, so that its properties do not change.

A preferred embodiment of the present invention consists of a ceramic composition that comprises between 60% and 70% by weight of a mixture of two frits with softening points higher than 700° C., between 25% and 40% by weight of two refractory compounds with melting points greater than 1,600° C. and whose compositions contain Zr and Cr, and between 3% and 10% by weight of a synthetic compound whose composition contains Cu, Cr and Mn. The ceramic composition is deposited on the metallic surface using any of the existing enamelling techniques in the prior art. The quantity deposited, expressed in grams of solids, is between 100 g/m² and 500 g/m², preferably between 200 g/m² and 350 g/m². It is then subjected to a thermal treatment at a temperature between 910° C. and 960° C. for 3 minutes. The obtained ceramic layer has a softening point between 870° C. and 930° C. and a coefficient of thermal expansion at 300° C. between $80 \times 10^{-7}$ °C.$^{-1}$ and $100 \times 10^{-7}$ °C.$^{-1}$.

Another preferred embodiment of the present invention consists of a ceramic composition that comprises between 60% and 80% by weight of a frit with a softening point above 800° C., between 25% and 40% by weight of a refractory compound with a melting point above 1,600° C. and whose composition contains $Cr_2O_3$ and/or $ZrO_2$, alone or mixed with $SiO_2$, and between 5% and 10% by weight of a synthetic compound whose composition contains Co or Cu or Fe or Mo or Mn or Cr, or a mixture of them. The ceramic composition is deposited on the metallic surface using any of the existing enamelling techniques in the prior art. The quantity deposited, expressed in grams of solids, is between 100 g/m² and 500 g/m², preferably between 200 g/m² and 350 g/m². It is then subjected to a thermal treatment at a temperature between 910° C. and 960° C. for 3 minutes. The obtained ceramic layer has a softening point between 850° C. and 890° C. and a coefficient of thermal expansion at 300° C. between $80 \times 10^{-7}$ °C.$^{-1}$ and $100 \times 10^{-7}$ °C.$^{-1}$.

Throughout the description and the claims, the word "comprises" and its variations are not intended to exclude other technical characteristics, additives, components, or steps. Also, the word "comprises" includes the case of "consists of". For experts in the subject, other objects, advantages, and characteristics of the invention are drawn from the description and in part from the practical execution of the invention.

PREFERRED EMBODIMENTS OF THE INVENTION

The following examples are provide for the purposes of illustration, and are not intended to limit the present invention. In addition, the present invention covers all of the possible combinations of specific and preferred embodiments described here.

The embodiments of the invention that are described below indicate the different components of the ceramic composition. In all cases, the procedure consisted of preparing the corresponding ceramic composition and depositing it on a metallic surface using a particular application technique. Depending on the technique, together with the ceramic composition, the components required for correct application were included, such as solvents and additives, widely known in the state of the art. Later, the metallic surface, together with the deposited ceramic composition, was subjected to a thermal treatment to obtain a ceramic layer responsible for giving the metallic surface the properties described throughout the present invention.

The evaluation of the results consisted of carrying out a series of tests on the metallic pieces after the ceramic composition had been deposited and after the thermal treatment had been applied, in other words, the metallic surface with the ceramic layer, as described in the present invention. The tests are described below.

Determination of resistance to citric acid at ambient temperature. According to standard UNE-EN ISO28706-1:2008.

Determination of resistance to sulphuric acid at ambient temperature. As specified in UNE-EN ISO28706-1:2008.

Determination of resistance to boiling sulphuric acid. As specified in UNE-EN ISO 28706-2:2008.

Determination of resistance to boiling hydrochloric acid. As specified in UNE-EN ISO 28706-2:2008.

Resistance to molten salts. A metallic piece was taken and the thickness and initial mass were measured. A cylindrical tablet of 200 mg consisting of a mixture of 60% $NaNO_3$ by weight and 40% $KNO_3$ by weight was deposited on said metallic piece and left in contact with it at 600° C. for 24 hours, followed by 30 minutes of cooling at 25° C. The piece was then washed with distilled water until no traces of the tablet remained. It was dried at 100° C. for 30 minutes and its stain resistance was evaluated according to the standard ISO 10545-14:1998.

Adhesion to the metallic substrate. According to the standard UNE-EN10209:2013.

Thermal resistance. A metallic piece was taken and the thickness and the initial mass and roughness were measured. It was then put into a laboratory oven at 700° C. for 90 followed by cooling at 25° C. for 30 minutes. The surface roughness and mass of the piece was then measured. If the weight loss was less than 0.05% and/or the surface roughness less than 1 micrometer, the test was considered to be satisfactory.

Stain resistance. According to the standard ISO10545-14: 1998.

EXAMPLE 1

First, two frits designated F1 and F2 were melted, varying their oxide compositions were based on the desired thermal properties (softening point, ½ sphere temperature, and fluidity temperature). Specifically, the oxide compositions of both frits comprise $SiO_2$ between 55% and 70% by weight, $R_2O$ between 7% and 20% by weight, RO between 0% and 15% by weight, MOx between 0% and 8% by weight, $MO_2$ between 0% and 7% by weight, $Al_2O_3$ 0.5% and 8% by weight, and $B_2O_3$ between 3% and 10% by weight; where $R_2O$ represents at least one oxide selected from among $Li_2O$, $Na_2O$ and $K_2O$ OR A mixture of them, where RO represents at least one oxide selected from among ZnO, MgO, CaO and BaO, or a mixture of them, where MOx represents at least one oxide selected from among CuO, $MnO_2$, $Fe_2O$, $MoO_3$, CoO and NiO, or a mixture of them, and where $MO_2$ represents at least one oxide selected from between $TiO_2$ and $CeO_2$ or a mixture of them. Table 1 shows the thermal properties of frits F1 and F2.

TABLE 1

|  | F1 | F2 |
| --- | --- | --- |
| Softening point (° C.) | 700 | 715 |
| ½ sphere T. (C.°) | 792 | 876 |
| Fluidity T. (° C.) | 828 | 968 |

The two frits are prepared using conventional techniques for melting industrial frit. The different raw materials that were the precursors of the oxides were mixed according to the composition of the frit. The mixture was then melted in an industrial oven at the typical temperatures for this process, using a mixture of gas and oxygen. The molten mixture was quickly cooled in a water bath to form the frit.

Based on frits F1 and F2, three ceramic compositions designated C1, C2 and C3 were prepared. The three compositions were adapted for correct application using airbrushing. In all cases, 250 g/m2, expressed as grams of solids, were applied to a metallic surface of AISI 316 steel. In all cases, the thermal treatment was at a maximum temperature of 960° C. for 3 minutes. Table 2 shows each one of the compositions, as well as the softening point and coefficient of thermal expansion of the obtained ceramic layer.

TABLE 2

| Component | Designation | C1 | C2 | C3 |
| --- | --- | --- | --- | --- |
| Frit | F1 | 100 | 28 | 25 |
| Frit | F2 |  | 42 | 45 |

TABLE 2-continued

| Component | Designation | C1 | C2 | C3 |
| --- | --- | --- | --- | --- |
| Refractory compound | Mullite | — | 10 | 15 |
| Refractory compound | Al2O3 | — | 20 | 10 |
| Synthetic compound | M0O3 | — | — | 5 |
| Softening point ceramic layer (° C.) | | 705 | 824 | 940 |
| Coefficient of thermal expansion at 300° C. ($\times 10^{-7}$ C.$^{-1}$) | | 96 | 89 | 90 |

Table 3 shows the results of the tests. The ceramic layers obtained from compositions C1 and C2 did not pass some of the tests, while the composition obtained with composition C3 passed all of the tests.

TABLE 3

| Test | C1 | C2 | C3 |
| --- | --- | --- | --- |
| Resistance to citric acid | AA | AA | AA |
| Resistance to sulphuric acid | AA | AA | AA |
| Resistance to boiling sulphuric acid (g/m$^2$) | <1.6 | <1.6 | <1.6 |
| Resistance to boiling hydrochloric acid (g/m$^2$) | <1.6 | <1.6 | <1.6 |
| Resistance to molten salts | 1 | 3 | 5 |
| Adhesion to the metallic substrate | Class 1 | Class 3 | Class 1 |
| Thermal resistance at 700° C. | No | No | Yes |
| Stain resistance | 1 | 4 | 5 |

EXAMPLE 2

Two frits designated F3 and F4 were melted, varying their oxide compositions were based on the desired thermal properties (softening point, ½ sphere temperature, and fluidity temperature). Specifically, the oxide compositions of both frits comprise $SiO_2$ between 55% and 70% by weight, $R_2O$ between 7% and 20% by weight, RO between 0% and 15% by weight, MOx between 0% and 8% by weight, $MO_2$ between 0% and 7% by weight, $Al_2O_3$ 0.5% and 8% by weight, and $B_2O_3$ between 3% and 10% by weight; where $R_2O$ represents at least one oxide selected from among $Li_2O$, $Na_2O$ and $K_2O$ or a mixture of them, where RO represents at least one oxide selected from among ZnO, MgO, CaO and BaO, or a mixture of them, where MOx represents at least one oxide selected from among CuO, $MnO_2$, $Fe_2O_3$, $MoO_3$, CoO and NiO, or a mixture of them, and where $MO_2$ represents at least one oxide selected from between $TiO_2$ and $CeO_2$ or a mixture of them. Table 4 shows the thermal properties of frits F3 and F4.

TABLE 4

|  | F3 | F4 |
| --- | --- | --- |
| Softening point (° C.) | 829 | 755 |
| ½ sphere T. (° C.) | 930 | 844 |
| Fluidity T. (° C.) | 1029 | 860 |

A composition designated C4 was prepared. Composition C4 was adapted for correct application by dip coating, and 250 g/m2, expressed as grams of solids, were applied to a metallic surface of AISI 310 steel. The application was subjected to a thermal treatment at a maximum temperature of 940° C. for 3 minutes. Table 5 shows composition C4, as well as the softening point and coefficient of thermal expansion of the obtained ceramic layer.

TABLE 5

| Component | Designation | C4 |
|---|---|---|
| Frit | F3 | 48 |
| Frit | F4 | 30 |
| Refractory compound | $SiO_2$ | 7 |
| Refractory compound | $Cr_2ZrO_5$ | 8 |
| Synthetic compound | $(FeCr)(CoNi)_2O_4$ | 7 |
| Softening point ceramic layer (° C.) | | 940 |
| Coefficient of thermal expansion at 300° C. ($\times 10^{-7}$ ° $C.^{-1}$) | | 94 |

Table 6 shows that the ceramic layer obtained from composition C4 passed all of the tests.

TABLE 6

| Test | C4 |
|---|---|
| Resistance to citric acid | AA |
| Resistance to sulphuric acid | AA |
| Resistance to boiling sulphuric acid (g/m²) | <1.6 |
| Resistance to boiling hydrochloric acid (g/m²) | <1.6 |
| Resistance to molten salts | 5 |
| Adhesion to the metallic substrate | Class 1 |
| Thermal resistance at 700° C. | Yes |
| Stain resistance | 5 |

EXAMPLE 3

Three compositions designated compositions C5, C6 and C7 were prepared and adapted for correct application using Electrophoretic Deposition. In all cases, 200 g/m2, expressed as grams of solids, were applied to a metallic surface of AISI 310 steel. In all three cases, thermal treatment at a maximum temperature of 955° C. was applied for 3 minutes. Table 7 shows each one of the compositions, as well as the softening point and coefficient of thermal expansion of the ceramic layer obtained in each case.

TABLE 7

| Component | Designation | C5 | C6 | C7 |
|---|---|---|---|---|
| Frit | F1 | 26 | 25 | |
| Frit | F2 | 38 | 37 | |
| Frit | F3 | | | 75 |
| Refractory compound | $Cr_2O_3$ | 18 | | 15 |
| Refractory compound | $ZrO_2$ | 12 | | |
| Refractory compound | $Cr_2ZrO_5$ | | 28 | |
| Synthetic compound | $(CuCrMn)_2O$ | 6 | 10 | 10 |
| Softening point ceramic layer (° C.) | | 880 | 900 | 875 |
| Coefficient of thermal expansion at 300° C. ($\times 10^{-7}$ ° $C.^{-1}$) | | 89 | 90 | 93 |

Table 8 shows that the ceramic layers obtained from compositions C5, C6, and C7 passed all of the tests.

TABLE 8

| Test | C5 | C6 | C7 |
|---|---|---|---|
| Resistance to citric acid | AA | AA | AA |
| Resistance to sulphuric acid | AA | AA | AA |
| Resistance to boiling sulphuric acid (g/m²) | <1.6 | <1.6 | <1.6 |
| Resistance to boiling hydrochloric acid (g/m²) | <1.6 | <1.6 | <1.6 |
| Resistance to molten salts | 5 | 5 | 5 |
| Adhesion to the metallic substrate | Class 1 | Class 1 | Class 1 |
| Thermal resistance at 700° C. | Yes | Yes | Yes |
| Stain resistance | 5 | 5 | 5 |

The invention claimed is:

1. A ceramic composition for the coating of metallic surfaces by means of thermal treatment that comprises:
    a. at least one frit whose percentage by weight is between 40% and 82%,
    b. at least one refractory compound with a melting point higher than 1600° C., and
    c. at least one synthetic compound comprising one or more elements selected from the group consisting of Co, Ni, Cu, Fe, Mo, Mn Cr, and a combination thereof;
    wherein the composition by weight of the at least one frit comprises $SiO_2$ between 55% and 70% by weight, $R_2O$ between 7% and 20% by weight, RO between 0% and 15% by weight, MOx between 0% and 8% by weight, $MO_2$ between 0% and 7% by weight, $Al_2O_3$ 0.5% and 8% by weight, and $B_2O_3$ between 3% and 10% by weight; where $R_2O$ represents at least one oxide selected from the group consisting of $Li_2O$, $Na_2O$, $K_2O$ and a combination thereof, where RO represents at least one oxide selected from the group consisting of ZnO, MgO, CaO, BaO and a combination thereof, where MOx represents at least one oxide selected from the group consisting of CuO, $MnO_2$, $Fe_2O_3$, $MoO_3$, CoO, NiO and a combination thereof, and where $MO_2$ represents at least one oxide selected from the group consisting of TiO, $CeO_2$ and a combination thereof.

2. The ceramic composition according to claim 1 in which the percentage by weight of the mixture of one or more refractory compounds is between 15% and 50%.

3. The ceramic composition according to claim 2, in which the mixture of one or more refractory compounds comprises at least one compound selected from the group consisting of $ZrO_2$, $Cr_2O_3$, $Al_2O_3$, $SiO_2$, $ZrSiO_4$, Mullite, and a compound that contains at least one of Zr, Cr, and Cu.

4. The ceramic composition according to claim 1 in which the percentage by weight of the mixture of one or more synthetic compounds is between 3% and 10%.

5. The ceramic composition according to claim 1, having a softening point after the thermal treatment between 850° C. and 960° C.

6. The ceramic composition according to claim 1, having a coefficient of thermal expansion at 300° C. after the thermal treatment between $80 \times 10^{-7}$ ° $C.^{-1}$ and $100 \times 10^{-7}$ ° $C.^{-1}$.

7. The ceramic composition according to claim 1 in which the at least one frit has a softening point higher than 675° C.

8. A method for coating a metallic surface for the formation of a ceramic layer, comprising two stages:
    depositing of a ceramic composition according to claim 1 on the metallic surface, and
    subjecting said surface to a thermal treatment at a maximum temperature of 980° C. for a maximum time of 10 minutes.

9. The method, according to claim 8, wherein the ceramic composition is deposited using the technique of airbrushing, curtain enamelling, ink injection, electrostatic deposition, electrophoretic deposition, silk-screening, dip coating, rotogravure, flexography, pad printing, or brush.

10. The method of claim 8, wherein the ceramic layer has a softening point of between 850° C. and 960° C.

11. The method of claim 8, wherein the ceramic layer has a coefficient of thermal expansion at 300° C. between $80 \times 10^{-7}$ ° $C.^{-1}$ and $100 \times 10^{-7}$ ° $C.^{-1}$.

* * * * *